(12) United States Patent
Pratt

(10) Patent No.: US 11,307,167 B2
(45) Date of Patent: Apr. 19, 2022

(54) SYSTEMS AND METHODS FOR MEASURING ELECTROLYTE CONTENT IN AN ELECTROCHEMICAL GAS SENSOR

(71) Applicant: HONEYWELL INTERNATIONAL INC., Morris Plains, NJ (US)

(72) Inventor: Keith Francis Edwin Pratt, Morris Plains, NJ (US)

(73) Assignee: Honeywell International Inc., Morris Plains, NJ (US)

(\*) Notice: Subject to any disclaimer, the term of this patent is extended or adjusted under 35 U.S.C. 154(b) by 74 days.

(21) Appl. No.: 16/817,999

(22) Filed: Mar. 13, 2020

(65) Prior Publication Data
US 2020/0300807 A1 Sep. 24, 2020

(30) Foreign Application Priority Data
Mar. 18, 2019 (EP) .................................. 19163539

(51) Int. Cl.
*G01N 27/26* (2006.01)
*G01N 27/416* (2006.01)
*G01N 27/413* (2006.01)

(52) U.S. Cl.
CPC ....... *G01N 27/4163* (2013.01); *G01N 27/413* (2013.01)

(58) Field of Classification Search
CPC ........ C12Q 2563/116; C12Q 2565/607; G01N 33/5438; G01N 27/06; G01N 15/1031; G01N 27/02; G01N 2458/30; G01N 27/413; G01N 27/4163; A61B 5/14532; A61B 5/1468
See application file for complete search history.

(56) References Cited

U.S. PATENT DOCUMENTS 5,624,546 A * 4/1997 Milco ................ G01N 27/4045
204/412
6,454,923 B1 8/2002 Dodgson et al.
(Continued)

FOREIGN PATENT DOCUMENTS

EP 2581734 A2 4/2013
GB 2332528 A 6/1999
(Continued)

OTHER PUBLICATIONS

Extended European Search Report for Patent Application No. 19163539.0 dated Oct. 2, 2019, 8 pages.

*Primary Examiner* — Alesa Allgood
(74) *Attorney, Agent, or Firm* — Alston & Bird LLP

(57) ABSTRACT

Example systems, apparatuses and methods are disclosed for measuring electrolyte content in an electrochemical gas sensor. An example system may comprise a separator material, a first electrode configured to be disposed on a first separator material surface, and a second electrode configured to be disposed on a second separator material surface. The example system may further comprise a wick material comprising a first wick material surface and a second wick material surface opposite the first wick material surface, a third electrode configured to be disposed facing the first wick material surface, and a fourth electrode configured to be disposed on the second wick material surface. The fourth electrode may be configured to measure an electrical conductivity through the wick material.

18 Claims, 6 Drawing Sheets

(56) References Cited

U.S. PATENT DOCUMENTS

| | | | |
|---|---|---|---|
| 2004/0128823 A1 | 7/2004 | Mole | |
| 2010/0236924 A1* | 9/2010 | Chapples | G01N 27/404 |
| | | | 204/412 |
| 2011/0060202 A1 | 3/2011 | Miller | |
| 2013/0309778 A1* | 11/2013 | Lowe | G01N 33/54326 |
| | | | 436/501 |
| 2017/0248544 A1* | 8/2017 | Pratt | G01N 27/4163 |
| 2018/0321186 A1 | 11/2018 | Looney et al. | |

FOREIGN PATENT DOCUMENTS

| | | |
|---|---|---|
| GB | 2436144 A | 9/2007 |
| WO | 01/31326 A1 | 5/2001 |
| WO | 2018/059719 A1 | 4/2018 |

\* cited by examiner

SYSTEMS AND METHODS FOR MEASURING ELECTROLYTE CONTENT IN AN ELECTROCHEMICAL GAS SENSOR

CROSS-REFERENCE TO RELATED APPLICATIONS

This specification is based upon and claims the benefit of priority from European patent application number EP 19163539.0 filed on Mar. 18, 2019, the entire contents of which are incorporated herein by reference.

TECHNOLOGICAL FIELD

Example embodiments of the present disclosure relate generally to sensors and, more particularly, to electrochemical gas sensors.

BACKGROUND

Industrial and commercial applications may use electrolyte-based electrochemical gas sensors to detect the presence of various gasses. However, conventional electrolyte-based electrochemical gas sensor designs are prone to decreased measurement sensitivity and even failure due to evaporation of the electrolyte contained therein.

Applicant has identified a number of deficiencies and problems associated with conventional electrolyte-based gas sensors. Through applied effort, ingenuity, and innovation, many of these identified problems have been solved by developing solutions that are included in embodiments of the present disclosure, many examples of which are described in detail herein.

SUMMARY

Systems, apparatuses, and methods (including, but not limited to methods of manufacturing) are disclosed herein for providing an electrolyte-based electrochemical gas sensor having an auxiliary electrode disposed on the wick material of the electrochemical gas sensor. The auxiliary electrode may be configured to measure electrolyte content in the electrochemical gas sensor by measuring the electrical conductivity across the wick material.

In one example embodiment, a system is provided for measuring electrolyte content in an electrochemical gas sensor. The system may comprise a separator material comprising a first separator material surface and a second separator material surface opposite the first separator material surface. The system may further comprise a first electrode configured to be disposed on the first separator material surface. The system may further comprise a second electrode configured to be disposed on the second separator material surface. The system may further comprise a wick material comprising a first wick material surface and a second wick material surface opposite the first wick material surface. The system may further comprise a third electrode configured to be disposed facing the first wick material surface. The system may further comprise a fourth electrode configured to be disposed on the second wick material surface. The fourth electrode may be configured to measure an electrical conductivity through the wick material.

In another example embodiment, a system is provided for measuring electrolyte content in an electrochemical gas sensor. The system may comprise a wick material comprising a first wick material surface and a second wick material surface opposite the first wick material surface. The system may further comprise a first electrode configured to be disposed on the first wick material surface. The system may further comprise a second electrode configured to be disposed on the second wick material surface. The system may further comprise electrolyte content monitoring circuitry in communication with the first electrode and the second electrode. The electrolyte content monitoring circuitry may be configured to measure an impedance between the second electrode and the first electrode. The electrolyte content monitoring circuitry may be further configured to measure an electrical conductivity through the wick material based on the measured impedance.

In another example embodiment, an apparatus is provided for measuring electrolyte content in an electrochemical gas sensor. The apparatus may comprise a separator material comprising a first separator material surface and a second separator material surface opposite the first separator material surface. The apparatus may further comprise a first electrode configured to be disposed on the first separator material surface. The apparatus may further comprise a second electrode configured to be disposed on the second separator material surface. The apparatus may further comprise a wick material comprising a first wick material surface and a second wick material surface opposite the first wick material surface. The apparatus stem may further comprise a third electrode configured to be disposed facing the first wick material surface. The apparatus may further comprise a fourth electrode configured to be disposed on the second wick material surface. The fourth electrode may be configured to measure an electrical conductivity through the wick material.

In another example embodiment, an apparatus is provided for measuring electrolyte content in an electrochemical gas sensor. The apparatus may comprise a wick material comprising a first wick material surface and a second wick material surface opposite the first wick material surface. The apparatus may further comprise a first electrode configured to be disposed on the first wick material surface. The apparatus may further comprise a second electrode configured to be disposed on the second wick material surface. The apparatus may further comprise electrolyte content monitoring circuitry in communication with the first electrode and the second electrode. The electrolyte content monitoring circuitry may be configured to measure an impedance between the second electrode and the first electrode. The electrolyte content monitoring circuitry may be further configured to measure an electrical conductivity through the wick material based on the measured impedance.

In another example embodiment, a method is provided for manufacturing an apparatus for measuring electrolyte content in an electrochemical gas sensor. The method may comprise providing a separator material comprising a separator material top surface and a separator material bottom surface opposite the separator material top surface. The method may further comprise disposing a first electrode on the separator material top surface. The method may further comprise disposing a second electrode on the separator material bottom surface. The method may further comprise providing a wick material comprising a wick material top surface and a wick material bottom surface opposite the wick material top surface. The method may further comprise providing a third electrode facing the wick material top surface. The method may further comprise disposing a fourth electrode on the wick material bottom surface.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those summarized above, some of which will be further described below.

BRIEF DESCRIPTION OF THE DRAWINGS

Having described certain example embodiments of the present disclosure in general terms above, reference will now be made to the accompanying drawings, which illustrate example embodiments and features of the present disclosure and are not necessarily drawn to scale. It will be understood that the components and structures illustrated in the drawings may or may not be present in various embodiments of the disclosure described herein. Accordingly, some embodiments or features of the present disclosure may include fewer or more components or structures than those shown in the drawings while not departing from the scope of the disclosure.

DETAILED DESCRIPTION

Figure 1A:
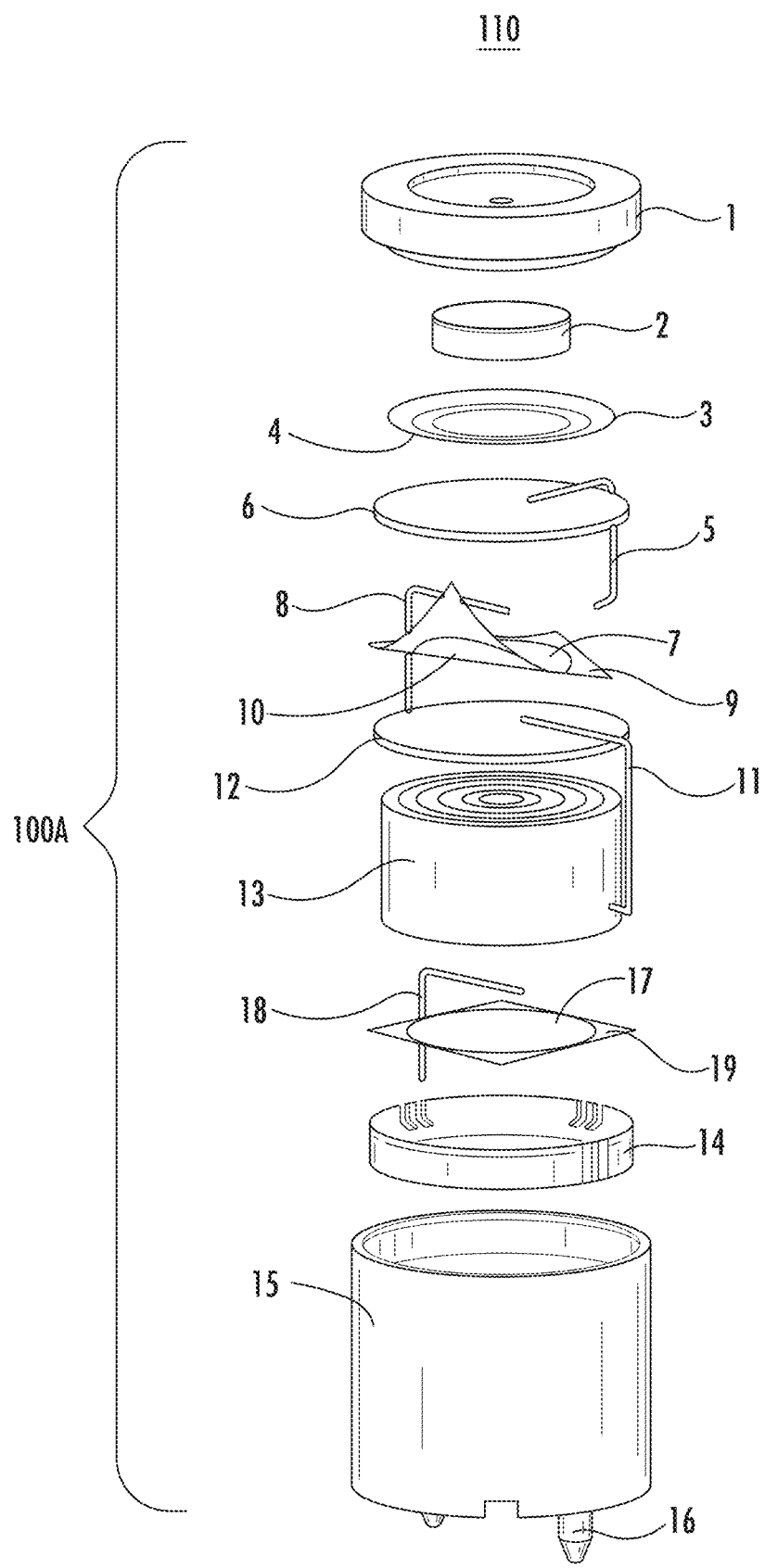
FIGS. 1A, 1B, 1C, and 1D illustrate exploded views of example electrochemical gas sensors configured to measure electrolyte content in accordance with some example embodiments described herein.

The following description should be read with reference to the drawings wherein like reference numerals indicate like elements throughout the several views. The detailed description and drawings show several embodiments which are meant to be illustrative of the disclosure. It should be understood that any numbering of disclosed features (e.g., first, second, etc.) and/or directional terms used in conjunction with disclosed features (e.g., front, back, top, bottom, side, and the like) are relative terms indicating illustrative relationships between the pertinent features.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The word "example," when used herein, is intended to mean "serving as an example, instance, or illustration." Any implementation described herein as an "example" is not necessarily preferred or advantageous over other implementations.

Traditional gas sensors containing liquid electrolytes can be prone to changes in the electrolyte due to evaporation during life. For aqueous electrolytes it is generally the water content of the electrolyte that changes, and some methods have been proposed to enable the resulting electrolyte concentration to be measured. However, some electrolytes themselves are volatile and may tend to evaporate over time, as a function of temperature. Examples of such electrolytes include propylene carbonate and acetonitrile. Often these electrolytes may be single component electrolytes. As a result, there may be no change in concentration and therefore no property of the electrolyte itself that can be measured.

Failure of such types of traditional gas sensors may occur when there is no longer enough electrolyte to maintain sufficient ionic contact between the electrodes or when there are sufficient dry paths through the electrolyte for gases to reach the reference electrode, causing drift in performance and potential loss of sensitivity. While a simple conductivity measurement at the sensing electrode might be sufficient to detect failure in some instances, that simple conductivity measurement might not be sufficiently sensitive to detect failure and may not give any advance warning of impending failure or prediction of remaining life.

The disclosure solves these problems by describing a unique design for an electrochemical gas sensor that makes use of a differential wicking approach to sensor design. In some embodiments, the electrochemical gas sensor disclosed herein comprises two types of fibrous material: one or more separators (e.g., made of separator material such as grade GF/A glass fiber having a mean particle filtration size of about 1.6 µm), which may be used separate the electrodes; and a wick (e.g., made of a wick material such as BS2000 glass fiber having a mean particle filtration size of about 4.8 µm), which may be used to fill or partially fill a reservoir and to feed electrolyte to the separators. The wick material may be designed to be less hydrophilic than the one or more separators so that when the wick material is in contact with the separator material and the electrolyte volume decreases (e.g., due to evaporation), the wick material dries out before the separator material.

In some embodiments, the electrochemical gas sensor disclosed herein is configured to perform a conductivity measurement (e.g., Reflex or Capa type pulse test; single or multiple frequency impedance spectroscopy) across the wick material rather than the typical conductivity measurement across the one or more separators. This conductivity measurement will allow the electrochemical gas sensor to monitor the drying of the wick material and provide advance warning of impending failure, since the wick material will dry out before the one or more separators. In some instances, the conductivity measurement is more than a simple "wet vs. dry" measurement since there may be some variation in conductivity as the wick becomes relatively dry and percolation effects result in an increasing impedance.

In some embodiments, the electrochemical gas sensor disclosed herein comprises one or more auxiliary electrodes to measure the conductivity through the wick material. Although the disclosure describes the features of the auxiliary electrode with reference to an electrochemical gas sensor, the auxiliary electrode disclosed herein may be applied in any suitable detector, sensor, gauge, instrument, or application where measurement of electrolyte content is desired.

In some embodiments, methods of measuring and compensating for electrolyte changes, such as those disclosed herein, are critical to the development of environmental compensation algorithms, fault diagnostics, and advance failure warnings for electrolyte-based electrochemical gas sensors.

Figure 1B:
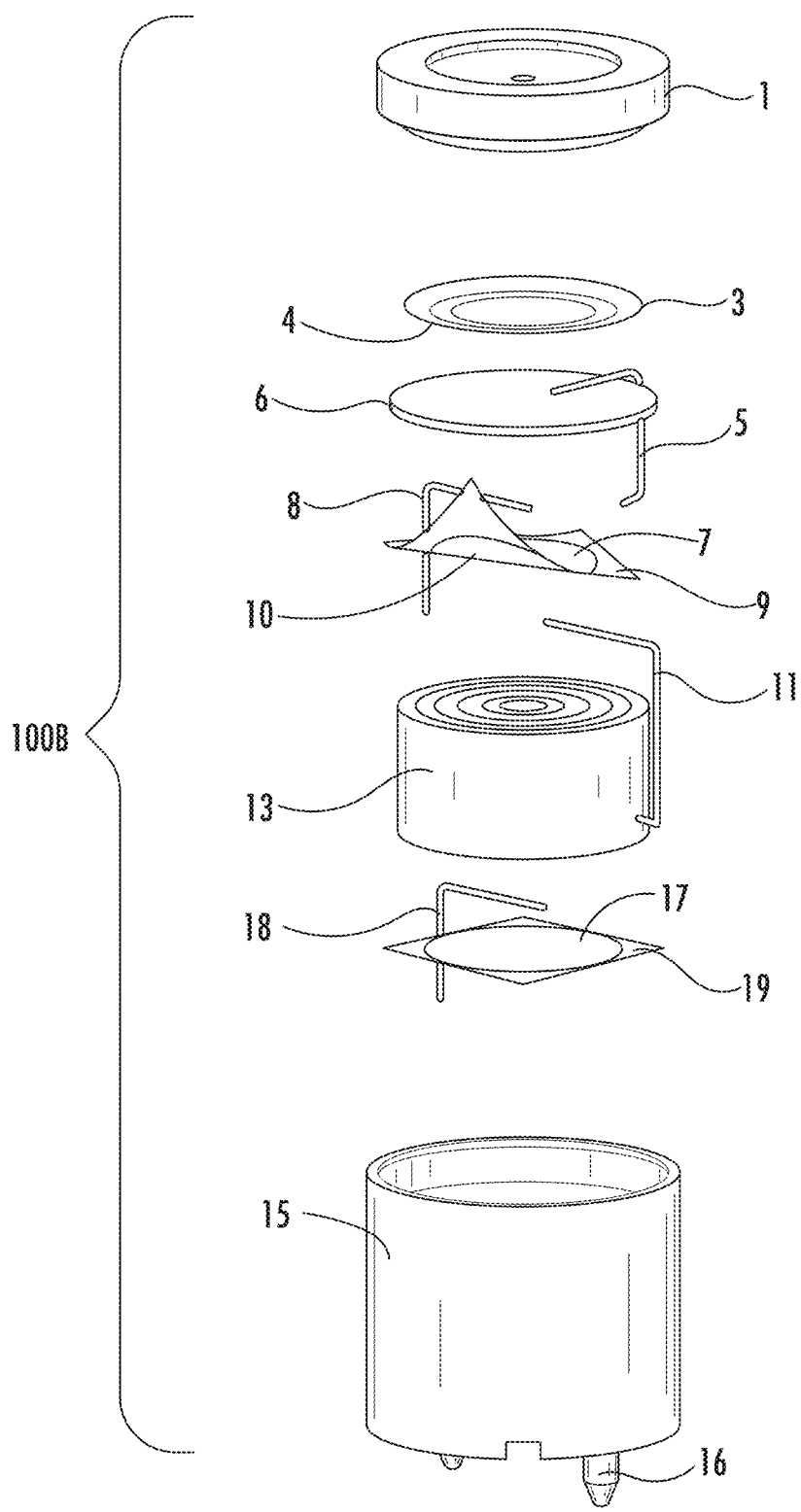
Figure 1C:
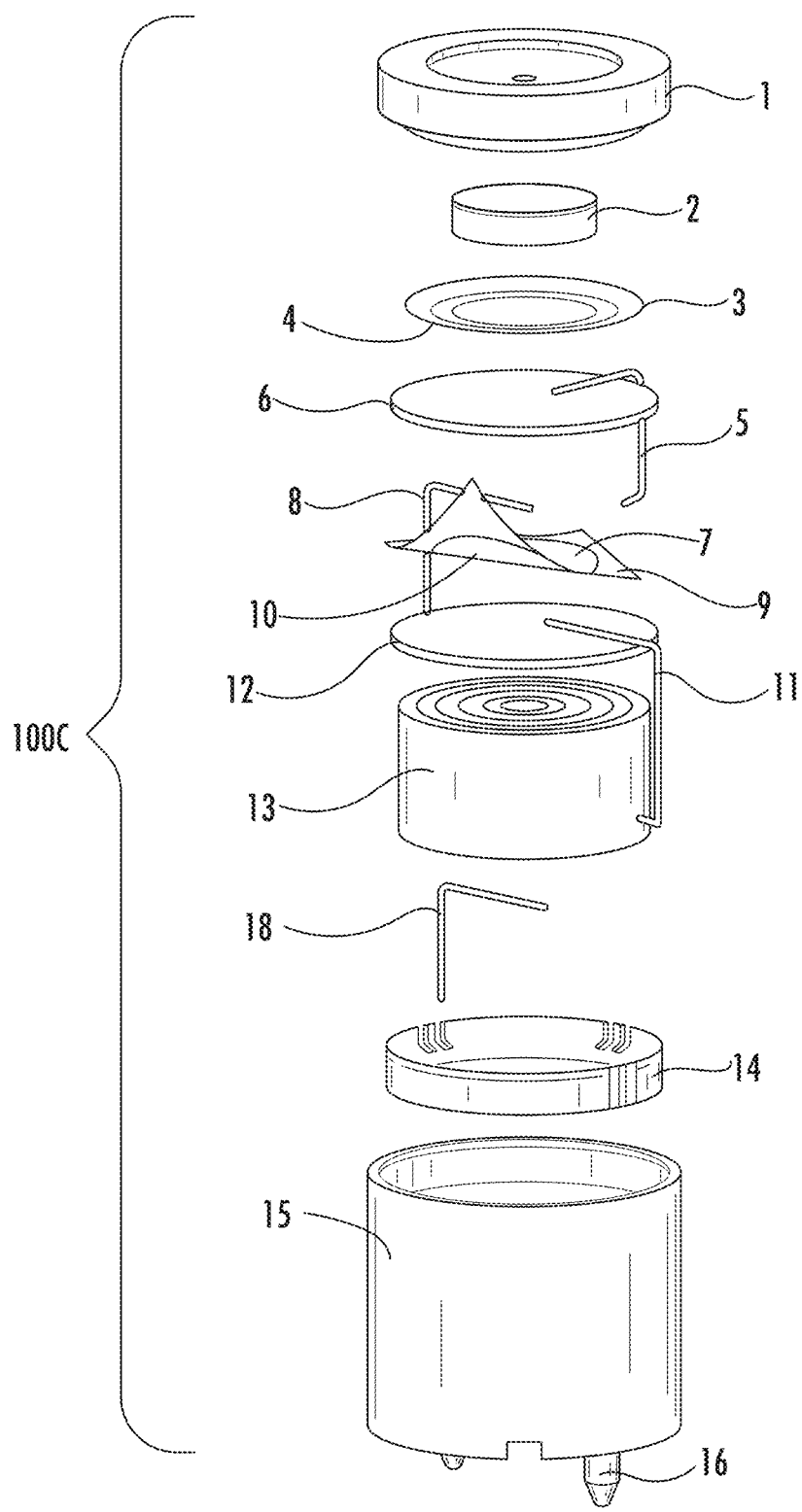
Figure 1D:
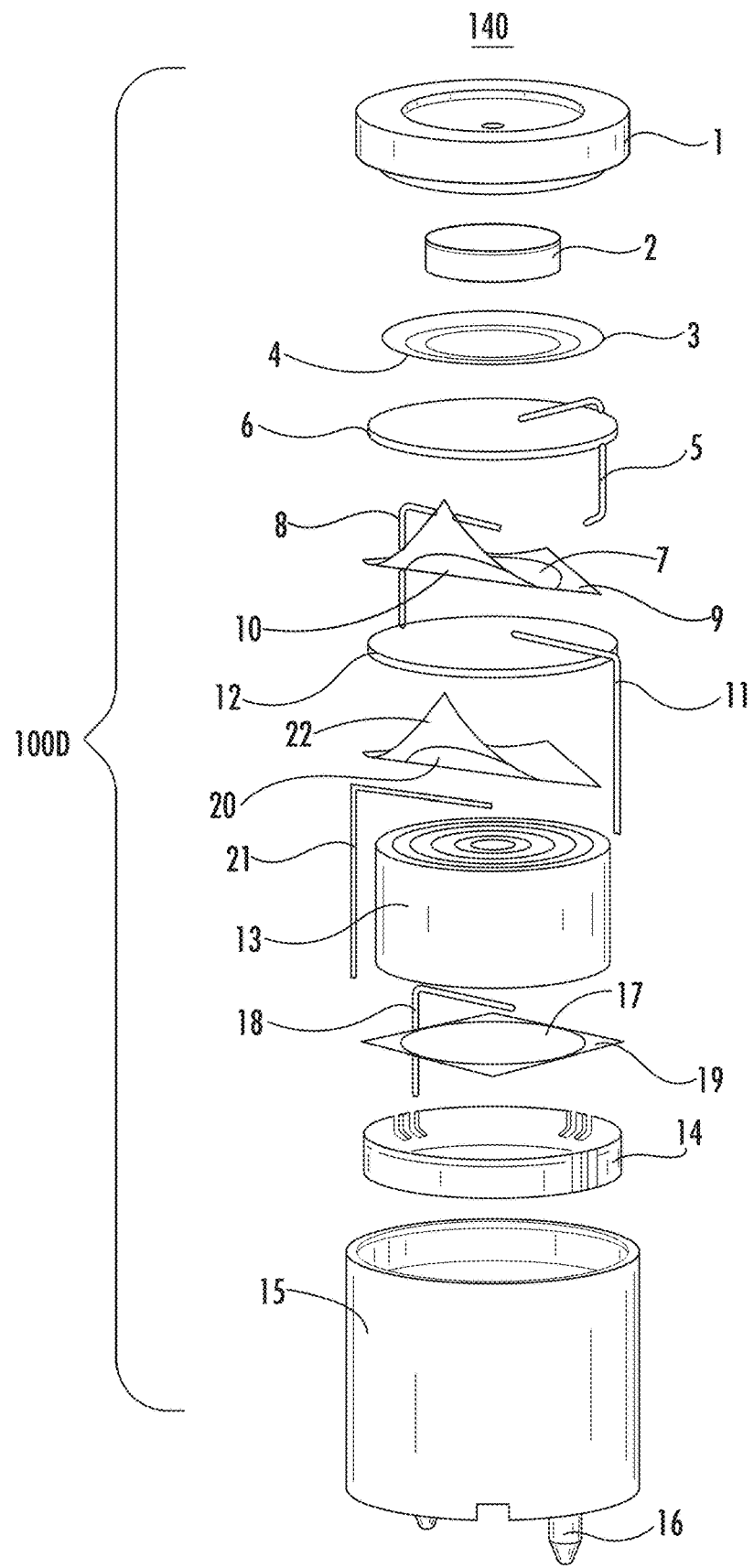

FIGS. 1A, 1B, 1C, and 1D illustrate exploded views of example electrochemical gas sensors configured to measure electrolyte content in accordance with some embodiments. For example, FIG. 1A illustrates an exploded view 110 of an example electrochemical gas sensor 100A, FIG. 1B illustrates an exploded view 120 of an example electrochemical gas sensor 100B, FIG. 1C illustrates an exploded view 130 of an example electrochemical gas sensor 100C, and FIG. 1D illustrates an exploded view 140 of an example electrochemical gas sensor 100D, As used herein, electrochemical gas sensor 100 may comprise any combination of components, structures, and features discussed with reference to example electrochemical gas sensor 100A, example electrochemical gas sensor 100B, example electrochemical gas sensor 100C, or example electrochemical gas sensor 100D, including the addition or omission of components, structures, and features.

In some embodiments, the example electrochemical gas sensor 100 (e.g., example electrochemical gas sensor 100A, example electrochemical gas sensor 100B, example electrochemical gas sensor 100C, example electrochemical gas sensor 100D, or a combination thereof, including, but not limited to, any combination of components, structures, and features discussed with reference thereto) may be a hardware device with embedded software configured to measure, detect, and transmit data (e.g., temperature, pressure, motion, and other suitable data). In some embodiments, the embedded software may be configured to run in an apparatus, device, or unit (e.g., firmware). In some embodiments, the example electrochemical gas sensor 100 may be a carbon monoxide sensor. In some embodiments, the example electrochemical gas sensor 100 may be applicable to other sensor and gas types.

In some embodiments, as shown in FIGS. 1A, 1B, 1C, and 1D, the electrochemical gas sensor 100 may comprise may comprise a top cap part 1 having an aperture defining a capillary hole in the center of the top cap part 1 to allow gas access to the sensing electrode 4.

In some embodiments, the example electrochemical gas sensor 100 may comprise a filter material 2. In some embodiments, the filter material 2 may be optionally provided depending on sensor type of the example electrochemical gas sensor 100. For example, FIGS. 1A, 1C, and 1D show an example electrochemical gas sensor 100A, an example electrochemical gas sensor 100C, and an example electrochemical gas sensor 100D that includes the filter material 2. In another example, FIG. 1B shows an example electrochemical gas sensor 100B that does not include the filter material 2.

In some embodiments, the example electrochemical gas sensor 100 may comprise a porous polytetrafluoroethylene (PTFE) film tape 3 to support the sensing electrode 4. The porous PTFE film tape 3 may be sealed against the top cap part 1 to retain electrolyte within the electrochemical gas sensor 100 while allowing gas to diffuse from the capillary hole in the center of the top cap part 1 to the sensing electrode 4 or, in some instances, through the filter material 2 to the sensing electrode 4.

In some embodiments, the example electrochemical gas sensor 100 may comprise a sensing electrode 4 deposited on porous PTFE film tape 3. The sensing electrode 4 may be deposited on the bottom surface of the porous PTFE film tape 3 (e.g., facing downwards) and thus is not visible in in FIGS. 1A, 1B, 1C, and 1D. In some embodiments, the example electrochemical gas sensor 100 may comprise a connecting wire 5 to electrically connect the sensing electrode 4 to a first pin of the pins 16.

In some embodiments, the example electrochemical gas sensor 100 may comprise a separator material 6. The separator material may be made of a hydrophilic material, such as a glass fiber material (e.g., grade GF/A glass fiber having a mean particle filtration size of about 1.6 μm).

In some embodiments, the example electrochemical gas sensor 100 may comprise a reference electrode 7 deposited onto the top surface of the porous PTFE film tape 9 (e.g., facing upwards). In some embodiments, the example electrochemical gas sensor 100 may comprise a connecting wire 8 to electrically connect the reference electrode 7 to a second pin of the pins 16.

In some embodiments, the example electrochemical gas sensor 100 may comprise a porous PTFE film tape 9 to support and electrically separate the reference electrode 7 and the counter electrode 10.

In some embodiments, the example electrochemical gas sensor 100 may comprise a counter electrode 10 deposited onto a bottom surface of the porous PTFE film tape 9 (e.g., facing downwards). In some embodiments, the example electrochemical gas sensor 100 may comprise a connecting wire 11 to electrically connect the counter electrode 10 to a third pin of the pins 16.

In some embodiments, the example electrochemical gas sensor 100 may comprise a separator material 12. The separator material 12 may be made of a hydrophilic material, such as a glass fiber material (e.g., grade GF/A glass fiber having a mean particle filtration size of about 1.6 μm). In some embodiments, the separator material 12 may be optionally provided to maintain wetting of the counter electrode 10 as the wick material 13 dries out (e.g., as the volume of the electrolyte content in the wick material 13 decreases). For example, FIGS. 1A, 1C, and 1D show an example electrochemical gas sensor 100A, an example electrochemical gas sensor 100C, and an example electrochemical gas sensor 100D that includes the separator material 12. In another example, FIG. 1B shows an example electrochemical gas sensor 100B that does not include the separator material 12.

In some embodiments, the example electrochemical gas sensor 100 may comprise a wick material 13. The wick material 13 may be made of a hydrophilic material (e.g., BS2000 glass fiber having a mean particle filtration size of about 4.8 μm). In some embodiments, the wick material 13 may be less hydrophilic than the separator material 6, the separator material 12, or both in order to absorb excess electrolyte material but selectively give up electrolyte material to the separator material 6, the separator material 12, or both as the electrolyte material in the wick material 13 dries out.

In some embodiments, the example electrochemical gas sensor 100 may comprise an epoxy material 14. The epoxy material 14 may be made of an epoxy material, such as a two-part epoxy amino resin. In some embodiments, the epoxy material 14 may be optionally provided to protect the inner surface of the pins 16 (e.g., the portion of the pins 16 disposed within the cavity structure of the housing part 15) from contact with electrolyte material. For example, FIGS. 1A, 1C, and 1D show an example electrochemical gas sensor 100A, an example electrochemical gas sensor 100C, and an example electrochemical gas sensor 100D that includes the epoxy material 14. In another example, FIG. 1B shows an example electrochemical gas sensor 100B that does not include the epoxy material 14.

In some embodiments, the example electrochemical gas sensor 100 may comprise a housing part 15 which may be sealed against the top cap part 1. In some embodiments, the filter material 2, the porous PTFE film tape 3, the sensing electrode 4, the connecting wire 5, the separator material 6, the reference electrode 7, the connecting wire 8, the porous PTFE film tape 9, the counter electrode 10, the connecting wire 11, the separator material 12, the wick material 13, the epoxy material 14, the inner surface of the pins 16, the auxiliary electrode 17, the connecting wire 18, the film tape 19, the auxiliary electrode 20, the connecting wire 21, the porous PTFE film tape 22, the additional separator disposed between the connecting wire 18 and the wick material 13, or a combination thereof may be configured to be disposed in the cavity structure of the housing part 15 and, in some instances, sealed in the cavity structure of the housing part 15 by the top cap part 1.

Figure 2:
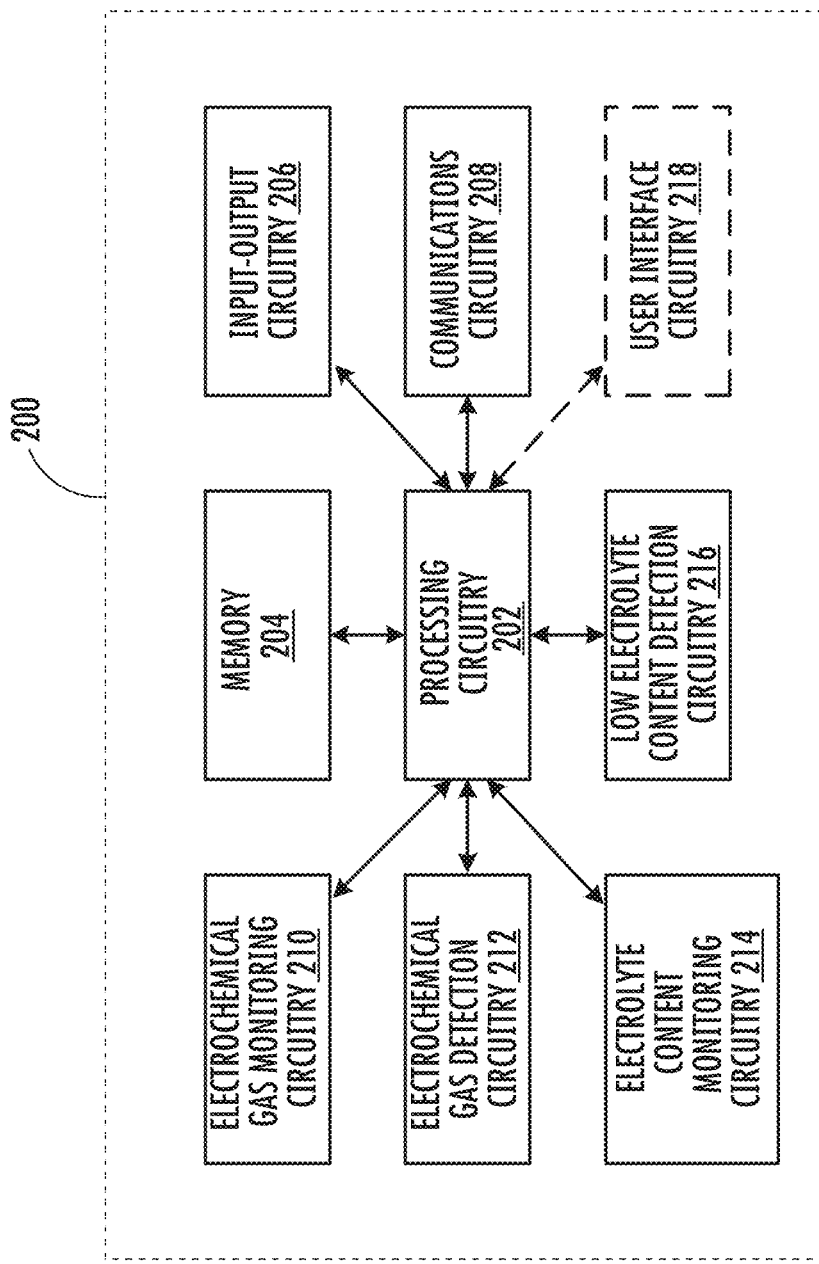
FIG. 2 illustrates an example schematic block diagram in accordance with some example embodiments described herein.

In some embodiments, the example electrochemical gas sensor 100 may comprise a plurality of pins 16 protruding through housing part 15 to provide electrical connection from sensing electrode 4, reference electrode 7, counter electrode 10, auxiliary electrode 17 (or connecting wire 18), auxiliary electrode 20 (or connecting wire 21), or a combination thereof to external circuitry, such as the electrolyte content monitoring circuitry 214 shown in FIG. 2.

In some embodiments, the example electrochemical gas sensor 100 may comprise an electrolyte material, such as a liquid electrolyte. For example, the electrolyte material may be disposed in the wick material 13, the separator material 6, the separator material 12, the additional separator disposed between the connecting wire 18 and the wick material 13, the cavity structure of the housing part 15, or a combination thereof.

In some embodiments, the example electrochemical gas sensor 100 may comprise an auxiliary electrode 17 to provide for an impedance measurement across the wick material 13. In some embodiments, the example electrochemical gas sensor 100 may comprise a connecting wire 18 to electrically connect the auxiliary electrode 17 to a fourth pin of the pins 16. In some embodiments, the example electrochemical gas sensor 100 may comprise a film tape 19. In some embodiments, the auxiliary electrode 17 may be deposited on a top surface of the film tape 19 (e.g., facing upwards). In some embodiments, the film tape 19 may be a porous PTFE film tape. In some embodiments, the film tape 19 may be a non-porous tape. In some embodiments, the film tape 19 may be optionally provided to support the auxiliary electrode 17. For example, FIGS. 1A, 1B, and 1D show an example electrochemical gas sensor 100A, an example electrochemical gas sensor 100B, and an example electrochemical gas sensor 100D that includes the auxiliary electrode 17 deposited on the top surface of the film tape 19. In another example, FIG. 1C shows an example electrochemical gas sensor 100C that does not include the auxiliary electrode 17 or the film tape 19. Rather, in FIG. 1C, the example electrochemical gas sensor 100C uses the connecting wire 18 itself as the auxiliary electrode.

In some embodiments, the example electrochemical gas sensor 100 may comprise an additional separator disposed between the connecting wire 18 and the wick material 13.

In some embodiments, as shown in FIG. 1D, the example electrochemical gas sensor 100 may comprise an additional auxiliary electrode 20 to provide for an impedance measurement across the wick material 13. In some embodiments, the example electrochemical gas sensor 100 may comprise a connecting wire 21 to electrically connect the additional auxiliary electrode 20 to a fifth pin of the pins 16. In some embodiments, the example electrochemical gas sensor 100 may comprise a porous PTFE film tape 22. In some embodiments, the additional auxiliary electrode 20 may be deposited on a bottom surface of the porous PTFE film tape 22 (e.g., facing downwards). In some embodiments, the porous PTFE film tape 22 may be optionally provided to support the additional auxiliary electrode 20. For example, FIG. 1D shows an example electrochemical gas sensor 100D that includes the additional auxiliary electrode 20 deposited on the bottom surface of the porous PTFE film tape 22. In another example, an example electrochemical gas sensor 100 may not include the additional auxiliary electrode 20 or the porous PTFE film tape 22. Rather, such an example electrochemical gas sensor 100 may use the connecting wire 21 itself as an auxiliary electrode.

As a foundation for some embodiments, the electrochemical gas sensor (e.g., electrochemical gas sensor 100) may comprise a separator material (e.g., separator material 6) comprising a first separator material surface (e.g., the top surface of the separator material 6) and a second separator material surface (e.g., the bottom surface of the separator material 6) opposite the first separator material surface.

In some embodiments, the electrochemical gas sensor may comprise a first electrode (e.g., sensing electrode 4) configured to be disposed on the first separator material surface of the separator material (e.g., the top surface of the separator material 6). In some embodiments, the first electrode may be a sensing electrode (e.g., sensing electrode 4). In some embodiments, the electrochemical gas sensor (e.g., electrochemical gas sensor 100) may comprise a first connecting wire (e.g., connecting wire 5) configured to connect the first electrode to a first electrical contact (e.g., a first pin of pins 16).

In some embodiments, the electrochemical gas sensor may comprise a second electrode (e.g., reference electrode 7) configured to be disposed on the second separator material surface of the separator material (e.g., the top surface of the separator material 6). In some embodiments, the second electrode may be a reference electrode (e.g., reference electrode 7). In some embodiments, the electrochemical gas sensor (e.g., electrochemical gas sensor 100) may comprise a second connecting wire (e.g., connecting wire 8) configured to connect the second electrode to a second electrical contact (e.g., a second pin of pins 16).

In some embodiments, the electrochemical gas sensor may comprise a wick material (e.g., wick material 13) comprising a first wick material surface (e.g., the top surface of the wick material 13) and a second wick material surface (e.g., the bottom surface of the wick material 13) opposite the first wick material surface. In some embodiments, the wick material may be designed to be less hydrophilic than the one or more separators so that when the wick material and the one or more separators are in contact and the electrolyte volume decreases (e.g., due to evaporation), the wick material dries out before the one or more separators. For example, the separator material (e.g., separator material 6) may comprise a first hydrophilic material (e.g., a material such as grade GF/A glass fiber having a mean particle filtration size of about 1.6 µm), the wick material may comprise a second hydrophilic material (e.g., made of material such as BS2000 glass fiber having a mean particle filtration size of about 4.8 µm), and the first hydrophilic material may be more hydrophilic than the second hydrophilic material.

In some embodiments, the electrochemical gas sensor may comprise a third electrode (e.g., counter electrode 10) configured to be disposed facing the first wick material surface of the wick material (e.g., the top surface of the wick material 13). In some embodiments, the third electrode may be a counter electrode (e.g., counter electrode 10). In some embodiments, the electrochemical gas sensor (e.g., electrochemical gas sensor 100) may comprise a third connecting wire (e.g., connecting wire 11) configured to connect the third electrode to a third electrical contact (e.g., a third pin of pins 16).

In some embodiments, as shown in FIG. 1B, the third electrode (e.g., counter electrode 10) may be configured to be disposed on the first wick material surface of the wick material (e.g., the top surface of the wick material 13).

In some embodiments, as shown in FIGS. 1A and 1C, the separator material (e.g., the separator material 6) may be a first separator material, and the electrochemical gas sensor 100 may comprise a second separator material (e.g., the separator material 12) comprising a third separator material surface (e.g., the top surface of the separator material 12) and a fourth separator material surface (e.g., the bottom surface of the separator material 12) opposite the third separator material surface. In some embodiments, the third electrode (e.g., counter electrode 10) may be configured to be disposed on the third separator material surface of the second separator material (e.g., the top surface of the separator material 12). In some embodiments, the third separator material surface of the second separator material (e.g., the top surface of the separator material 12) may be configured to be disposed on the third electrode (e.g., counter electrode 10), and the fourth separator material surface of the second separator material (e.g., the bottom surface of the separator material 12) may be configured to be disposed on the first wick material surface of the wick material (e.g., the top surface of the wick material 13).

In some embodiments, the electrochemical gas sensor may comprise a fourth electrode (e.g., auxiliary electrode 17, connecting wire 18) configured to be disposed on the second wick material surface of the wick material (e.g., the bottom surface of the wick material 13). In some embodiments, the fourth electrode may be configured to measure an electrical conductivity through the wick material. In some embodiments, the fourth electrode may be an auxiliary electrode (e.g., auxiliary electrode 17). In some embodiments, the fourth electrode may be a wire electrode (e.g., connecting wire 18). In some embodiments, the fourth electrode may be an area electrode (e.g., auxiliary electrode 17). In some embodiments, the fourth electrode may comprise platinum. In some embodiments, the fourth electrode may comprise carbon. In some embodiments, the fourth electrode may be porous. In some embodiments, the fourth electrode may be non-porous. In some embodiments, the fourth electrode may be disposed on a surface of a PTFE film tape (e.g., the top surface of the film tape 19 in an embodiment wherein the film tape 19 is a PTFE film tape). In some embodiments, the electrochemical gas sensor (e.g., electrochemical gas sensor 100) may comprise a fourth connecting wire (e.g., connecting wire 18) configured to connect the fourth electrode to a fourth electrical contact (e.g., a fourth pin of pins 16).

In some embodiments, the electrochemical gas sensor may comprise a housing part (e.g., housing part 15) comprising a cavity structure. The separator material (e.g., separator material 6), the first electrode (e.g., sensing electrode 4), the second electrode (e.g., reference electrode 7), the wick material (e.g., wick material 13), the third electrode (e.g., counter electrode 10), and the fourth electrode (e.g., auxiliary electrode 17, connecting wire 18) may be configured to be disposed in the cavity structure of the housing part (e.g., housing part 15).

In some embodiments, the electrochemical gas sensor may comprise, or be electrically connected to (e.g., via pins 16), electrolyte content monitoring circuitry (e.g., electrolyte content monitoring circuitry 214 shown in FIG. 2) in communication with the third electrode (e.g., counter electrode 10) and the fourth electrode (e.g., auxiliary electrode 17, connecting wire 18), wherein the electrolyte content monitoring circuitry is configured to: measure an impedance between the fourth electrode (e.g., auxiliary electrode 17, connecting wire 18) and the third electrode (e.g., counter electrode 10); and measure an electrical conductivity through the wick material (e.g., wick material 13) based on the measured impedance.

In some embodiments, the electrochemical gas sensor may comprise a top cap part (e.g., top cap part 1) configured to be disposed on a surface of the housing part (e.g., housing part 15). In some embodiments, the top cap part may define an aperture configured to provide a capillary hole structure to allow gas access to the first electrode (e.g., sensing electrode 4).

In some embodiments, as shown in FIG. 1D, the electrochemical gas sensor may comprise a fifth electrode (e.g., auxiliary electrode 20, connecting wire 21) disposed on the first wick material surface (e.g., the top surface of the wick material 13). In some embodiments, the fifth electrode may be configured to measure an electrical conductivity through the wick material. In some embodiments, the fifth electrode may be an auxiliary electrode (e.g., auxiliary electrode 20). In some embodiments, the fourth electrode may be a first auxiliary electrode, and the fifth electrode may be a second auxiliary electrode. In some embodiments, the fifth electrode may be a wire electrode (e.g., connecting wire 21). In some embodiments, the fifth electrode may be an area electrode (e.g., auxiliary electrode 20). In some embodiments, the fifth electrode may comprise platinum. In some embodiments, the fifth electrode may comprise carbon. In some embodiments, the fifth electrode may be porous. In some embodiments, the fifth electrode may be non-porous. In some embodiments, the fifth electrode may be disposed on a surface of a PTFE film tape (e.g., the bottom surface of the porous PTFE film tape 22). In some embodiments, the electrochemical gas sensor (e.g., electrochemical gas sensor 100) may comprise a fifth connecting wire (e.g., connecting wire 21) configured to connect the fifth electrode to a fifth electrical contact (e.g., a fifth pin of pins 16).

In some embodiments, the electrochemical gas sensor may comprise, or be electrically connected to (e.g., via pins 16), electrolyte content monitoring circuitry (e.g., electrolyte content monitoring circuitry 214 shown in FIG. 2) in communication with the fourth electrode (e.g., auxiliary electrode 17, connecting wire 18) and the fifth electrode (e.g., auxiliary electrode 20, connecting wire 21). In some embodiments, the electrolyte content monitoring circuitry may be configured to: measure an impedance between the fourth electrode (e.g., auxiliary electrode 17, connecting wire 18) and the fifth electrode (e.g., auxiliary electrode 20, connecting wire 21); and measure an electrical conductivity through the wick material based on the measured impedance.

As another foundation for some embodiments, the electrochemical gas sensor (e.g., electrochemical gas sensor 100) may comprise a wick material (e.g., wick material 13) comprising a first wick material surface (e.g., the top surface of the wick material 13) and a second wick material surface (e.g., the bottom surface of the wick material 13) opposite the first wick material surface. In some embodiments, the electrochemical gas sensor may comprise a first electrode (e.g., counter electrode 10, auxiliary electrode 20, or connecting wire 21) configured to be disposed on the first wick material surface (e.g., the top surface of the wick material 13). In some embodiments, the electrochemical gas sensor may comprise a second electrode (e.g., auxiliary electrode 17 or connecting wire 18) configured to be disposed on the second wick material surface (e.g., the bottom surface of the wick material 13). In some embodiments, the electrochemical gas sensor may comprise, or be electrically connected to (e.g., via pins 16), electrolyte content monitoring circuitry (e.g., electrolyte content monitoring circuitry 214) in communication with the first electrode (e.g., counter electrode 10, auxiliary electrode 20, or connecting wire 21) and the second electrode (e.g., auxiliary electrode 17 or connecting wire 18). The electrolyte content monitoring circuitry may be configured to measure an impedance between the second electrode and the first electrode. The electrolyte content monitoring circuitry may be further configured to measure an electrical conductivity through the wick material based on the measured impedance.

In some embodiments, by measuring the impedance across the wick material, which preferentially dries out as the electrolyte evaporates, the electrochemical gas sensor may provide advance warning before the electrolyte volume becomes low enough for sensor performance to be degraded. For example, performance may be degraded when there is no longer sufficient electrolyte to maintain separator material 6 and optional separator material 12 in a fully wetted state.

The example electrochemical gas sensor 100 described with reference to FIG. 1 may be embodied by one or more computing apparatuses, such as apparatus 200 shown in FIG. 2. As illustrated in FIG. 2, the apparatus 200 may include processing circuitry 202, memory 204, input-output circuitry 206, communications circuitry 208, electrochemical gas monitoring circuitry 210, electrochemical gas detection circuitry 212, electrolyte content monitoring circuitry 214, low electrolyte content detection circuitry 216, and user interface circuitry 218. The apparatus 200 may be configured to execute the operations described above with respect to FIG. 1 and below with respect to FIG. 3. Although some of these components 202-218 are described with respect to their functional capabilities, it should be understood that the particular implementations necessarily include the use of particular hardware to implement such functional capabilities. It should also be understood that certain of these components 202-218 may include similar or common hardware. For example, two sets of circuitry may both leverage use of the same processor, network interface, storage medium, or the like to perform their associated functions, such that duplicate hardware is not required for each set of circuitry.

The use of the term "circuitry" as used herein with respect to components of the apparatus 200 therefore includes particular hardware configured to perform the functions associated with respective circuitry described herein. Of course, while the term "circuitry" should be understood broadly to include hardware, in some embodiments, circuitry may also include software for configuring the hardware. For example, in some embodiments, "circuitry" may include processing circuitry, storage media, network interfaces, input-output devices, and other components. In some embodiments, other elements of the apparatus 200 may provide or supplement the functionality of particular circuitry. For example, the processing circuitry 202 may provide processing functionality, memory 204 may provide storage functionality, and communications circuitry 208 may provide network interface functionality, among other features.

In some embodiments, the processing circuitry 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. For example, the memory 204 may be an electronic storage device (e.g., a computer readable storage medium). In another example, the memory 204 may be a non-transitory computer-readable storage medium storing computer-executable program code instructions that, when executed by a computing system, cause the computing system to perform the various operations described herein. The memory 204 may be configured to store information, data, content, signals applications, instructions (e.g., computer-executable program code instructions), or the like, for enabling the apparatus 200 to carry out various functions in accordance with example embodiments of the present disclosure. For example, the memory 204 may be configured to store electrolyte content monitoring techniques; capacitance measurement techniques; impedance measurement techniques; monitored data; ranges of monitored data; ranges of frequencies (e.g., band-gap filters); electrolyte content monitoring signals; any other suitable data or data structures; or any combination or combinations thereof. It will be understood that the memory 204 may be configured to store partially or wholly any electronic information, data, data structures, embodiments, examples, figures, processes, operations, techniques, algorithms, instructions, systems, apparatuses, methods, or computer program products described herein, or any combination thereof.

The processing circuitry 202 may be embodied in a number of different ways and may, for example, include one or more processing devices configured to perform independently. Additionally or alternatively, the processing circuitry 202 may include one or more processors configured in tandem via a bus to enable independent execution of instructions, pipelining, multithreading, or a combination thereof. The use of the term "processing circuitry" may be understood to include a single core processor, a multi-core processor, multiple processors internal to the apparatus, remote or "cloud" processors, or a combination thereof.

In an example embodiment, the processing circuitry 202 may be configured to execute instructions stored in the memory 204 or otherwise accessible to the processing circuitry 202. Alternatively or additionally, the processing circuitry 202 may be configured to execute hard-coded functionality. As such, whether configured by hardware or software methods, or by a combination of hardware with software, the processing circuitry 202 may represent an entity (e.g., physically embodied in circuitry) capable of performing operations according to an embodiment of the present disclosure while configured accordingly. As another example, when the processing circuitry 202 is embodied as an executor of program code instructions, the instructions may specifically configure the processor to perform the operations described herein when the instructions are executed.

In some embodiments, the apparatus 200 may include input-output circuitry 206 that may, in turn, be in communication with processing circuitry 202 to provide output to the user and, in some embodiments, to receive input such as a command provided by the user. The input-output circuitry 206 may comprise a user interface, such as a graphical user interface (GUI), and may include a display that may include a web user interface, a GUI application, a mobile application, a client device, or any other suitable hardware or software. In some embodiments, the input-output circuitry 206 may also include a keyboard, a mouse, a joystick, a display device, a display screen, a touch screen, touch areas, soft keys, a microphone, a speaker (e.g., a buzzer), a light emitting device (e.g., a red light emitting diode (LED), a green LED, a blue LED, a white LED, an infrared (IR) LED, an ultraviolet (UV) LED, or a combination thereof), or other input-output mechanisms. The processing circuitry 202, input-output circuitry 206 (which may utilize the processing circuitry 202), or both may be configured to control one or more functions of one or more user interface elements through computer-executable program code instructions (e.g., software, firmware) stored in a non-transitory computer-readable storage medium (e.g., memory 204). Input-output circuitry 206 is optional and, in some embodiments, the apparatus 200 may not include input-output circuitry. For example, where the apparatus 200 does not interact directly with the user, the apparatus 200 may generate user interface data for display by one or more other devices with which one or more users directly interact and transmit the generated user interface data to one or more of those devices. For example, the apparatus 200, using user interface circuitry 218, may generate user interface data for display by one or more display devices and transmit the generated user interface data to those display devices.

The communications circuitry 208 may be any device or circuitry embodied in either hardware or a combination of hardware and software that is configured to receive or transmit data from or to a network or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. In some embodiments, the communication interface may include the circuitry for interacting with the antenna(s) to cause transmission of signals via the antenna(s) or to handle receipt of signals received via the antenna(s). These signals may be transmitted or received by the apparatus 200 using any of a number of Internet, Ethernet, cellular, satellite, or wireless technologies, such as IEEE 802.11, Code Division Multiple Access (CDMA), Global System for Mobiles (GSM), Universal Mobile Telecommunications System (UMTS), Long-Term Evolution (LTE), Bluetooth® v1.0 through v5.0, Bluetooth Low Energy (BLE), infrared wireless (e.g., IrDA), ultra-wideband (UWB), induction wireless transmission, Wi-Fi, near field communications (NFC), Worldwide Interoperability for Microwave Access (WiMAX), radio frequency (RF), RFID, or any other suitable technologies.

The electrochemical gas monitoring circuitry 210 includes hardware components designed or configured to receive, process, generate, and transmit data, such as the presence of a particular gas (e.g., carbon monoxide). In some embodiments, the electrochemical gas monitoring circuitry 210 may be in communication with an electrode (e.g., sensing electrode 4) for monitoring the presence of a particular gas. The electrochemical gas monitoring circuitry 210 may be configured to generate an electrochemical gas monitoring signal and transmit the generated electrochemical gas monitoring signal to the electrochemical gas detection circuitry 212.

The electrochemical gas detection circuitry 212 includes hardware components designed or configured to receive, process, generate, and transmit data, such as electrochemical gas monitoring signals. In some embodiments, the electrochemical gas detection circuitry 212 may analyze the electrochemical gas monitoring signal to determine that the presence of a particular gas has been detected. For example, the electrochemical gas detection circuitry 212 may generate a root mean square (RMS) electrochemical gas monitoring signal based on the electrochemical gas monitoring signal. The electrochemical gas detection circuitry 212 may detect the presence of a particular gas when the RMS electrochemical gas monitoring signal exceeds a predetermined electrochemical gas monitoring threshold value. In response to detecting the presence of the particular gas, the electrochemical gas detection circuitry 212 may generate an electrochemical gas alert signal and transmit the electrochemical gas alert signal to the input-output circuitry 206, the communications circuitry 208, or both for alerting a user or a system (e.g., an alarm system, a safety shut down system) that the presence of a particular gas has been detected.

The electrolyte content monitoring circuitry 214 includes hardware components designed or configured to receive, process, generate, and transmit data, such as electrolyte content monitoring signals. In some embodiments, the electrolyte content monitoring circuitry 214 may be configured to measure an impedance between a pair of electrodes disposed facing or on the wick material (e.g., wick material 13). In some embodiments, the electrolyte content monitoring circuitry 214 may be configured to measure an electrical conductivity through the wick material (e.g., wick material 13) based on the measured impedance.

In some embodiments, the impedance measurement may take the form of an electrical pulse (e.g., voltage pulse and measurement of current), or an alternating current (AC) signal at either a single frequency or multiple frequencies (e.g., using impedance spectroscopy). In some embodiments, the electrolyte content monitoring circuitry 214 may measure impedance between an auxiliary electrode (e.g., auxiliary electrode 17 or connecting wire 18) and a counter electrode (e.g., counter electrode 10). In other embodiments, the electrolyte content monitoring circuitry 214 may measure impedance between two auxiliary electrodes (e.g., auxiliary electrodes 17 and 20, or connecting wires 18 and 21). In still other embodiments, the electrolyte content monitoring circuitry 214 may measure impedance between other pairs of electrodes. For example, the electrolyte content monitoring circuitry 214 may measure impedance across the separator material (e.g., the separator material 6) by, in some instances, measuring the impedance between the first electrode (e.g., the sensing electrode 4) and the second electrode (e.g., the reference electrode 7). Subsequently, the electrolyte content monitoring circuitry 214 may use the ratio of the impedance across the wick material (e.g. the wick material 13) to the impedance across the separator material (e.g., the separator material 6) to compensate for changes in electrolyte impedance due to temperature.

In some embodiments, the electrolyte content monitoring circuitry 214 may be in communication with the third electrode (e.g., counter electrode 10) and the fourth electrode (e.g., auxiliary electrode 17, connecting wire 18). The electrolyte content monitoring circuitry may configured to: measure an impedance between the fourth electrode (e.g., auxiliary electrode 17, connecting wire 18) and the third electrode (e.g., counter electrode 10); and measure an electrical conductivity through the wick material (e.g., wick material 13) based on the measured impedance.

In some embodiments, the electrolyte content monitoring circuitry 214 may be in communication with the fourth electrode (e.g., auxiliary electrode 17, connecting wire 18)

and the fifth electrode (e.g., auxiliary electrode 20, connecting wire 21). In some embodiments, the electrolyte content monitoring circuitry may be configured to: measure an impedance between the fourth electrode (e.g., auxiliary electrode 17, connecting wire 18) and the fifth electrode (e.g., auxiliary electrode 20, connecting wire 21); and measure an electrical conductivity through the wick material based on the measured impedance.

In some embodiments, the electrolyte content monitoring circuitry 214 may be in communication with a first electrode (e.g., counter electrode 10, auxiliary electrode 20, or connecting wire 21) and a second electrode (e.g., auxiliary electrode 17 or connecting wire 18). The electrolyte content monitoring circuitry 214 may be configured to measure an impedance between the second electrode and the first electrode. The electrolyte content monitoring circuitry may be further configured to measure an electrical conductivity through the wick material based on the measured impedance.

In some embodiments, the electrolyte content monitoring circuitry 214 may be configured to perform a conductivity measurement across the wick material using a Reflex or Capa type pulse test. In some embodiments, the electrolyte content monitoring circuitry 214 may be configured to perform a conductivity measurement across the wick material using single or multiple frequency impedance spectroscopy. This conductivity measurement will allow the electrolyte content monitoring circuitry 214 to monitor the drying of the wick material and the low electrolyte content detection circuitry 216 provide advance warning of impending failure, since the wick material will dry out before the one or more separators. In some instances, the conductivity measurement may comprise some variation in conductivity as the wick becomes relatively dry and percolation effects result in an increasing impedance.

The low electrolyte content detection circuitry 216 includes hardware components designed or configured to receive, process, generate, and transmit data, such as electrolyte content monitoring signals. In some embodiments, the low electrolyte content detection circuitry 216 may analyze the electrochemical gas monitoring signal to determine that the electrolyte content in the wicking material has fallen below a predetermined electrolyte content level. For example, the low electrolyte content detection circuitry 216 may generate a root mean square (RMS) electrolyte content monitoring signal based on the electrolyte content monitoring signal received from the electrolyte content monitoring circuitry 214. The low electrolyte content detection circuitry 216 may detect low electrolyte content when the RMS electrolyte content monitoring signal falls below a predetermined electrolyte content monitoring threshold value. In response to detecting the presence of the low electrolyte content, the low electrolyte content detection circuitry 216 may generate a low electrolyte content alert signal and transmit the electrochemical gas alert signal to the input-output circuitry 206, the communications circuitry 208, or both for alerting a user or a system that the electrolyte content in the electrochemical gas sensor is low and thus the electrolyte should be replenished or the electrochemical gas sensor should be replaced.

The user interface circuitry 218 includes hardware components designed or configured to receive, process, generate, and transmit data, such as user interface data. In some embodiments, the user interface circuitry 218 may be configured to generate user interface data indicative of a set of monitoring modes for a particular gas type or environment, electrochemical gas monitoring signals, RMS electrochemical gas monitoring signals, predetermined electrochemical gas monitoring threshold value (e.g., settable by a user using input-output circuitry 206 or a user device in communication with input-output circuitry 206; settable by accessing a table of predetermined electrochemical gas monitoring threshold values for various gas types), electrochemical gas alert signals, electrolyte content monitoring signals, RMS electrolyte content monitoring signals, electrolyte content values (including, but not limited to, electrolyte content percentage values), low electrolyte alert signals, and combinations thereof. In some instances, the user interface data may comprise a list (e.g., a selectable drop-down list, a ordered grouping of selectable icons (e.g., clickable icons configured to be clicked by a mouse; virtual icons configured to be displayed on a touchscreen and pressed by a user's finger), a text-based prompt, a voice-based prompt) of monitoring modes. For instance, the user interface circuitry 218 may include hardware components designed or configured to generate the user interface data based on any embodiment or combination of embodiments described with reference to FIGS. 1-3.

In some embodiments, the user interface circuitry 218 may be in communication with a display device (e.g., input-output circuitry 206, a user device, or a display device communicatively coupled thereto) and thus configured to transmit the user interface data to the display device. For example, the user interface circuitry 218 may be configured to generate user interface data and transmit the generated user interface data to the input-output circuitry 206, and the input-output circuitry 206 may be configured to receive the user interface data and display the received user interface data on one or more display screens.

In some embodiments, each of the electrochemical gas monitoring circuitry 210, electrochemical gas detection circuitry 212, electrolyte content monitoring circuitry 214, low electrolyte content detection circuitry 216, and user interface circuitry 218 may include a separate processor, specially configured field programmable gate array (FPGA), application specific interface circuit (ASIC), or cloud utility to perform the above functions. In some embodiments, the hardware components described above with reference to electrochemical gas monitoring circuitry 210, electrochemical gas detection circuitry 212, electrolyte content monitoring circuitry 214, low electrolyte content detection circuitry 216, and user interface circuitry 218, may, for instance, utilize communications circuitry 208 or any suitable wired or wireless communications path to communicate with a user device, each other, or any other suitable circuitry or device.

In some embodiments, one or more of the electrochemical gas monitoring circuitry 210, electrochemical gas detection circuitry 212, electrolyte content monitoring circuitry 214, low electrolyte content detection circuitry 216, and user interface circuitry 218 may be hosted locally by the apparatus 200. In some embodiments, one or more of the electrochemical gas monitoring circuitry 210, electrochemical gas detection circuitry 212, electrolyte content monitoring circuitry 214, low electrolyte content detection circuitry 216, and user interface circuitry 218 may be hosted remotely (e.g., by one or more cloud servers) and thus need not physically reside on the apparatus 200. Thus, some or all of the functionality described herein may be provided by a remote circuitry. For example, the apparatus 200 may access one or more remote circuitries via any sort of networked connection that facilitates transmission of data and electronic information between the apparatus 200 and the remote circuitries. In turn, the apparatus 200 may be in remote communication with one or more of the electrochemical gas monitoring circuitry 210, electrochemical gas detection circuitry 212, electrolyte content monitoring circuitry 214, low electrolyte content detection circuitry 216, and user interface circuitry 218.

As described above and as will be appreciated based on this disclosure, embodiments of the present disclosure may be configured as systems, apparatuses, methods, mobile devices, backend network devices, computer program products, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices. As will be appreciated, any computer program instructions and/or other type of code described herein may be loaded onto a computer, processor or other programmable apparatus's circuitry to produce a machine, such that the computer, processor, or other programmable circuitry that executes the code on the machine creates the means for implementing various functions, including those described herein.

In some embodiments, the user device may be embodied by one or more computing devices or systems that also may include processing circuitry, memory, input-output circuitry, and communications circuitry. For example, a user device may be a laptop computer on which an app (e.g., a GUI application) is running or otherwise being executed by processing circuitry. In yet another example, a user device may be a smartphone on which an app (e.g., a webpage browsing app) is running or otherwise being executed by processing circuitry. As it relates to operations described in the present disclosure, the functioning of these devices may utilize components similar to the similarly named components described above with respect to FIG. 2. Additional description of the mechanics of these components is omitted for the sake of brevity. These device elements, operating together, provide the respective computing systems with the functionality necessary to facilitate the communication of data with the example electrochemical gas sensor described herein.

Having described specific components and structures of example devices involved in the present disclosure, example procedures for providing an electrochemical gas sensor configured to measure electrolyte content are described below in connection with FIG. 3.

Figure 3:
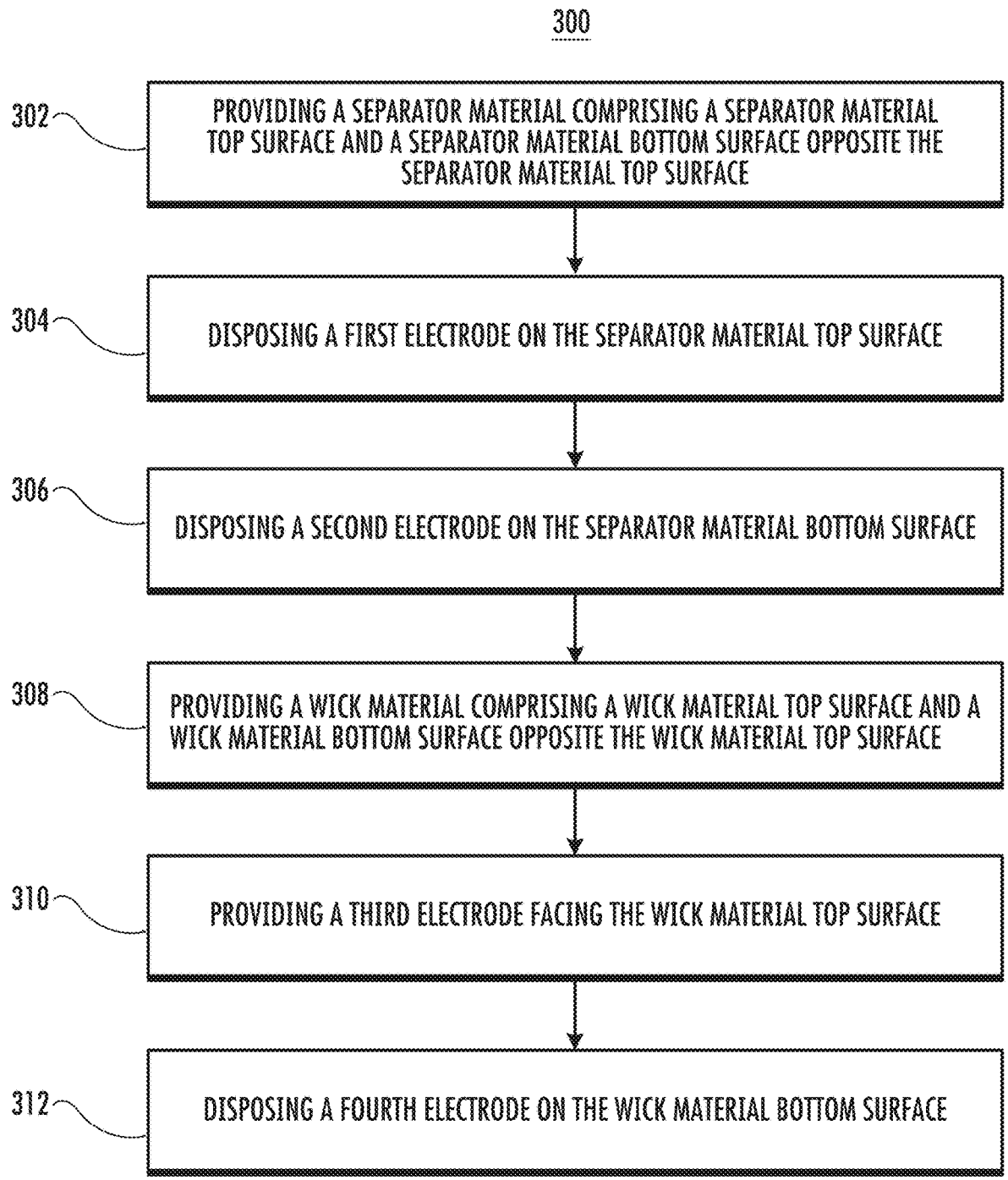
FIG. 3 illustrates an example flowchart illustrating an example method for providing an electrochemical gas sensor configured to measure electrolyte content in accordance with some example embodiments described herein.

FIG. 3 illustrates an example flowchart 300 that contains example operations for providing an electrochemical gas sensor configured to measure electrolyte content according to some example embodiments described herein.

As shown by operation 302, the example flowchart 300 may begin by providing a separator material (e.g., separator material 6) comprising a separator material top surface and a separator material bottom surface opposite the separator material top surface.

As shown by operation 304, the example flowchart 300 may proceed to disposing a first electrode (e.g., sensing electrode 4) on the separator material top surface.

As shown by operation 306, the example flowchart 300 may proceed to disposing a second electrode (e.g., reference electrode 7) on the separator material bottom surface.

As shown by operation 308, the example flowchart 300 may proceed to providing a wick material (e.g., wick material 13) comprising a wick material top surface and a wick material bottom surface opposite the wick material top surface.

As shown by operation 310, the example flowchart 300 may proceed to providing a third electrode (e.g., counter electrode 10) facing the wick material top surface.

As shown by operation 312, the example flowchart 300 may proceed to disposing a fourth electrode (e.g., auxiliary electrode 17, connecting wire 18) on the wick material bottom surface.

Optionally (not shown in FIG. 3), the separator material may a first separator material, the separator material top surface may be a first separator material top surface, and the separator material bottom surface may be a first separator material bottom surface. Optionally, the example flowchart 300 may proceed to providing a second separator material (e.g., separator material 12) comprising a second separator material top surface and a second separator material bottom surface opposite the second separator material top surface. Optionally, the example flowchart 300 may proceed to disposing the third electrode on the second separator material top surface. Optionally, the example flowchart 300 may proceed to disposing the second separator material bottom surface on the wick material top surface.

In some embodiments, operations 302, 304, 306, and 308, 310, and 312 may not necessarily occur in the order depicted in FIG. 3. In some embodiments, one or more of the operations depicted in FIG. 3 may occur substantially simultaneously. In some embodiments, one or more additional operations may be involved before, after, or between any of the operations shown in FIG. 3.

As described above, FIG. 3 illustrates an example flowchart describing operations performed in accordance with example embodiments of the present disclosure. It will be understood that each block of the flowchart, and combinations of blocks in the flowchart, may be implemented by various means, such as devices comprising hardware, firmware, one or more processors, and/or circuitry associated with execution of software comprising one or more computer program instructions. For example, one or more of the procedures described above may be performed by material handling equipment (e.g., a robotic arm, servo motor, motion controllers, and the like) and computer program instructions residing on a non-transitory computer-readable storage memory. In this regard, the computer program instructions which embody the procedures described above may be stored by a memory of an apparatus employing an embodiment of the present disclosure and executed by a processor of the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. When executed, the instructions stored in the computer-readable storage memory produce an article of manufacture configured to implement the various functions specified in flowchart blocks. Moreover, execution of a computer or other processing circuitry to perform various functions converts the computer or other processing circuitry into a particular machine configured to perform an example embodiment of the present disclosure.

Accordingly, the described flowchart blocks support combinations of means for performing the specified functions and combinations of operations for performing the specified functions. It will also be understood that one or more flowchart blocks, and combinations of flowchart blocks, can be implemented by special purpose hardware-based computer systems which perform the specified functions, or combinations of special purpose hardware that execute computer instructions.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," and similar words are not intended to limit the order of the steps; these words are simply used to guide the reader through the description of the methods. Further, any reference to claim elements in the singular, for example, using the articles "a," "an" or "the," is not to be construed as limiting the element to the singular and may, in some instances, be construed in the plural.

As described above and with reference to FIGS. 1-3, example embodiments of the present disclosure thus provide for an electrochemical gas sensor configured to measure electrolyte content, monitor the drying of the wick material, and provide advance warning of impending failure, since the wick material may dry out before the one or more separators. Thus, the electrochemical gas sensor disclosed herein may easily and cost-effectively meet all of the performance requirements and also be sufficiently sensitive to detect failure and provide advance warning of impending failure, prediction of remaining life, or both.

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatuses and systems described herein, it is understood that various other components may be used in conjunction with the components and structures disclosed herein. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying drawings, and in some cases one or more of the steps depicted may occur substantially simultaneously, or additional steps may be involved. Although specific terms are employed herein, they are used in a generic and descriptive sense only and not for purposes of limitation.

The invention claimed is:

1. A system for measuring electrolyte content in an electrochemical gas sensor, the system comprising:
   a first separator material comprising a first separator material surface and a second separator material surface opposite the first separator material surface;
   a second separator material comprising a third separator material surface and a fourth separator material surface;
   a first electrode disposed on the first separator material surface;
   a second electrode disposed on the second separator material surface;
   a wick material comprising a first wick material surface and a second wick material surface opposite the first wick material surface;
   a third electrode disposed facing the first wick material surface, wherein the first electrode, the second electrode, and the third electrode are configured to operate together to detect a presence of a selected gas in a gas sample contacting the first electrode; and a fourth electrode disposed on the second wick material surface, wherein the fourth electrode is configured to measure an electrical conductivity through the wick material, wherein the third separator material surface is configured to be disposed on the third electrode, wherein the fourth separator material surface is configured to be disposed on the first wick material surface, wherein the second separator material comprises a first hydrophilic material, wherein the wick material comprises a second hydrophilic material, and wherein the first hydrophilic material is more hydrophilic than the second hydrophilic material, such that when the wick material and the second separator material are in contact and in an instance in which a volume of an electrolyte material decreases, the wick material dries out before the second separator material.

2. The system of claim 1, wherein the fourth electrode is a wire electrode.

3. The system of claim 1, wherein the fourth electrode is an area electrode.

4. The system of claim 1, wherein the fourth electrode comprises platinum.

5. The system of claim 1, wherein the fourth electrode comprises carbon.

6. The system of claim 1, wherein the fourth electrode is porous.

7. The system of claim 1, wherein the fourth electrode is non-porous.

8. The system of claim 1, wherein the fourth electrode is disposed on a surface of a polytetrafluoroethylene (PTFE) film tape.

9. The system of claim 1, wherein the third electrode is configured to be disposed on the first wick material surface.

10. The system of claim 1, wherein the first separator material comprises the first hydrophilic material.

11. The system of claim 1, wherein the system further comprises:
 a first connecting wire configured to connect the first electrode to a first electrical contact;
 a second connecting wire configured to connect the second electrode to a second electrical contact;
 a third connecting wire configured to connect the third electrode to a third electrical contact; and
 a fourth connecting wire configured to connect the fourth electrode to a fourth electrical contact.

12. The system of claim 1, wherein the wick material partially fills a reservoir of the electrochemical gas sensor, the wick material configured to feed electrolyte material to the separator materials.

13. The system of claim 1, wherein the first electrode is a sensing electrode, wherein the second electrode is a reference electrode to the first electrode, wherein the third electrode is a counter electrode to the first electrode, and wherein the fourth electrode is an auxiliary electrode.

14. The system of claim 13, wherein the fourth electrode is a first auxiliary electrode and wherein the system further comprises: a fifth electrode disposed on the first wick material surface, wherein the fifth electrode is a second auxiliary electrode configured to measure an electrical conductivity through the wick material.

15. An apparatus for measuring electrolyte content in an electrochemical gas sensor, the apparatus comprising:
 a first separator material comprising a first separator material surface and a second separator material surface opposite the first separator material surface;
 a second separator material comprising a third separator material surface and a fourth separator material surface;
 a first electrode disposed on the first separator material surface;
 a second electrode disposed on the second separator material surface;
 a wick material comprising a first wick material surface and a second wick material surface opposite the first wick material surface;
 a third electrode disposed on the first wick material surface;
 electrolyte detection circuitry in communication with the first electrode, the second electrode, and the third electrode, wherein the electrolyte detection circuitry is configured to detect a presence of a selected gas in a gas sample contacting the first electrode;
 a fourth electrode disposed on the second wick material surface,
 wherein the third separator material surface is configured to be disposed on the third electrode,
 wherein the fourth separator material surface is configured to be disposed on the first wick material surface,
 wherein the second separator material comprises a first hydrophilic material, wherein the wick material comprises a second hydrophilic material, and wherein the first hydrophilic material is more hydrophilic than the second hydrophilic material, such that when the wick material and the second separator material are in contact and in an instance in which a volume of an electrolyte material decreases, the wick material dries out before the second separator material; and
 electrolyte content monitoring circuitry in communication with the third electrode and the fourth electrode, wherein the electrolyte content monitoring circuitry is configured to
  measure an impedance between the fourth electrode and the third electrode, and
  measure an electrical conductivity through the wick material based on the measured impedance.

16. The apparatus of claim 15, wherein the first electrode is a sensing electrode, wherein the second electrode is a reference electrode to the first electrode, wherein the third electrode is a counter electrode to the first electrode, and wherein the fourth electrode is an auxiliary electrode.

17. A method for manufacturing an apparatus for measuring electrolyte content in an electrochemical gas sensor, the method comprising:
 providing a first separator material comprising a first separator material top surface and a first separator material bottom surface opposite the first separator material top surface;
 disposing a first electrode on the first separator material top surface;
 disposing a second electrode on the first separator material bottom surface;
 providing a wick material comprising a wick material top surface and a wick material bottom surface opposite the wick material top surface;
 providing a third electrode facing the wick material top surface, wherein the first electrode, the second electrode, and the third electrode are configured to detect a presence of a selected gas in a gas sample contacting the first electrode;
 providing a second separator material comprising a second separator material top surface and a second separator material bottom surface;

disposing the third electrode on the second separator material top surface;

disposing the second separator material bottom surface on the wick material top surface; and disposing a fourth electrode on the wick material bottom surface, wherein the second separator material comprises a first hydrophilic material, wherein the wick material comprises a second hydrophilic material, and wherein the first hydrophilic material is more hydrophilic than the second hydrophilic material, such that when the wick material and the second separator material are in contact and in an instance in which a volume of an electrolyte material decreases, the wick material dries out before the second separator material.

18. The method of claim 17, wherein the first electrode is a sensing electrode, wherein the second electrode is a reference electrode to the first electrode, wherein the third electrode is a counter electrode to the first electrode, and wherein the fourth electrode is an auxiliary electrode.

* * * * *